March 26, 1963   R. C. BYLOFF   3,083,327
REGULATED CONTROL SYSTEM
Filed Dec. 10, 1958   3 Sheets-Sheet 1
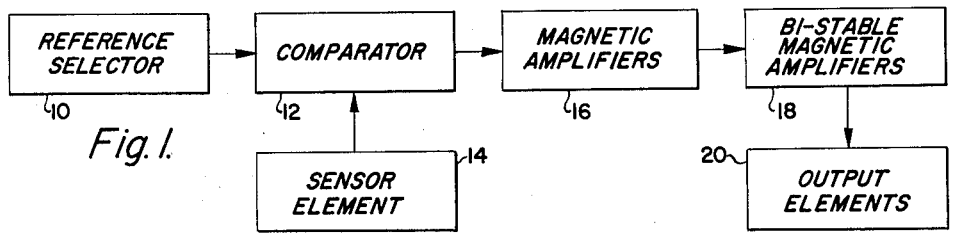
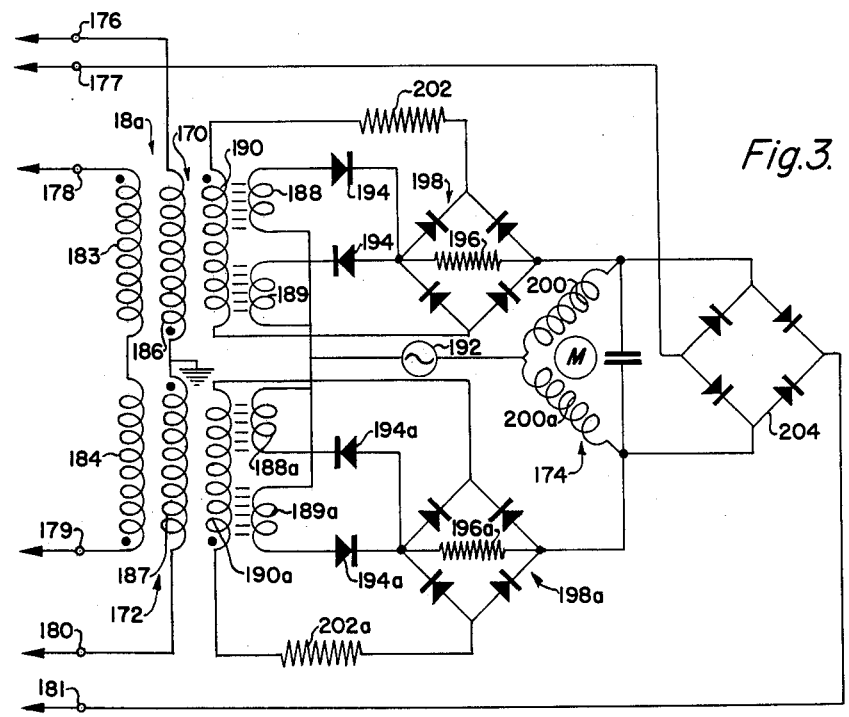
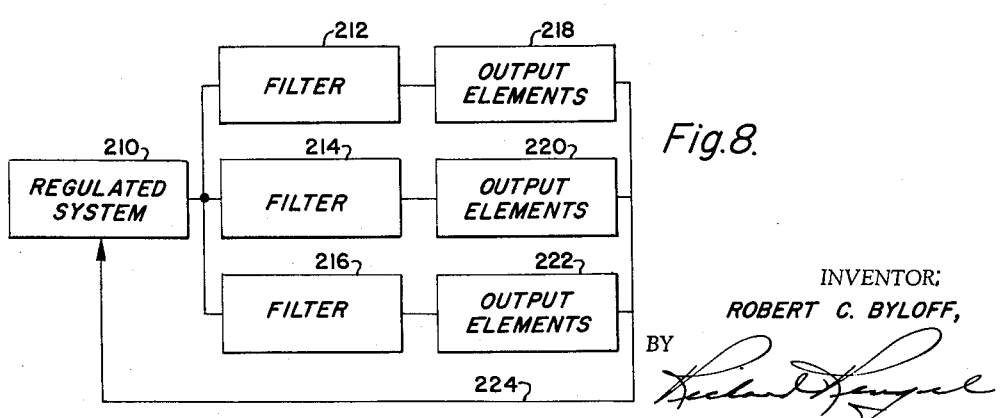
INVENTOR:
ROBERT C. BYLOFF,
BY
Attorney.

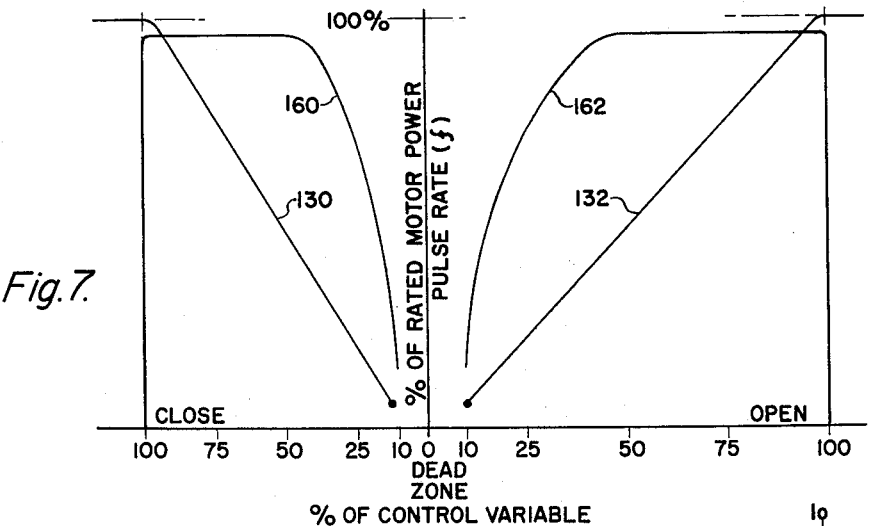
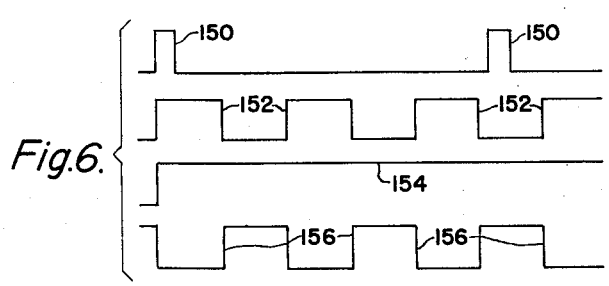
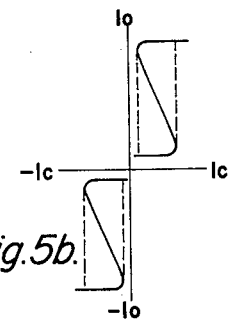
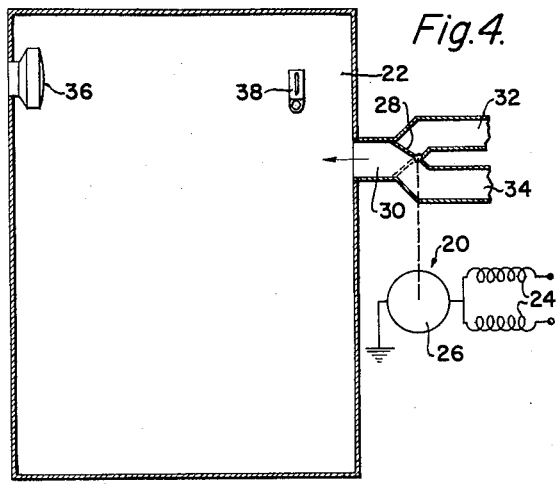
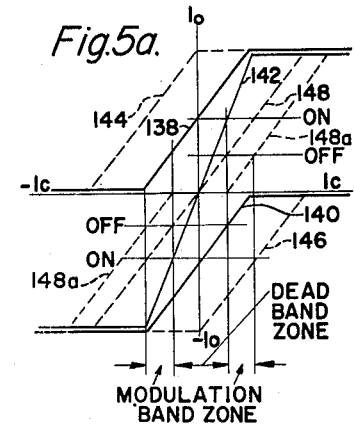
INVENTOR:
ROBERT C. BYLOFF,

United States Patent Office 3,083,327
Patented Mar. 26, 1963

3,083,327
REGULATED CONTROL SYSTEM
Robert C. Byloff, Los Angeles, Calif., assignor to The Garrett Corporation, Los Angeles, Calif., a corporation of California
Filed Dec. 10, 1958, Ser. No. 779,495
25 Claims. (Cl. 318—202)

The present invention relates to control systems and more particularly to regulated control systems providing pulse duration modulated signals for supplying a regulated power output.

In regulated control systems, it is a common practice to regulate the system by floating control or closed loop systems in which the output is measured or sensed to be converted into quantities which are capable of being differentially compared with preselected quantities of a control selector or reference to produce a resultant or error input signal to subsequent amplification stages.

The input signal is usually of low amplitude, requiring at least two stages of amplification including one or more low signal level input stages prior to a power stage. The output of the power stage provides the regulated power signal required by the system output elements to operate at the preselected level of the reference quantity.

Often, the system output elements require application of full power instantaneously to operate satisfactorily. For example, the torque required to move a control valve may be large due to forces acting on the valve and high torque requirements for sealing the valve in its valve seat. If the power signal supplied to a valve actuator is to be proportional to the magnitude of the error, for example, temperature error, the error must increase until sufficient power is available at an actuator to produce sufficient torque to alter a valve position. The stability of a system of this latter type is frequently marginal in the region in which the error signal is insufficient to operate the actuator, and the region or dead band zone in which the error signal is insufficient to operate the actuator is variable, depending upon the torque required to move the valve.

This difficulty is overcome in the present invention by providing proportional pulse or pulse duration modulation of the error signal wherein an error detected at the edge of a narrow dead band zone is converted from a variable amplitude signal to full power pulses of varying pulse duration which are coupled to system output elements such as the valve actuator or valve motor. Small error signals producing control currents extending circuit operation past the dead zone are of short duration providing excellent inching operation of a valve motor. As the magnitude of the error increases, the full power pulses are of longer duration with decreasing intervals or spacing between pulses until, at the edge of the modulation band, full and continuous power is applied to system output elements.

It is an object therefore, to provide a control system having the foregoing features and advantages.

Another object is to provide a pulse generator for producing power pulses.

Still another object is to provide a pulse generator employing feedback for cyclic variation in gain and bistable operation for producing power pulses.

A further object is to provide a modulator for providing pulse duration modulation in response to varying amplitude input signals.

Another object of the present invention is to provide a modulation generator responsive to input signals varying in amplitude and polarity to produce pulses having a duration and polarity corresponding to the amplitude and polarity of the input signals.

A further object of the present invention is to provide a multistage amplifier arrangement for producing pulse duration modulated power pulses in response to input signals varying in amplitude in which negative feedback cyclically reduces the gain whereby the period of the conducting portion of the cycle is proportional to the amplitude of the input signals, and high positive magnetic feedback provides bi-stable operation for "snap-action" operation of a power amplifier stage.

Still another object of the invention is to provide bistable static magnetic amplifier circuits producing pulse duration modulated power pulses over a modulation band zone in which the negative magnetic feedback controls the operation to reduce the output of the power amplifier to quiescent values.

A further object of the invention is to provide a regulated system in which the regulated power output is modulated in pulse duration proportional to the amplitude of an error signal.

A still further object is to provide a regulated motor control system in which the power supplied to the motor is modulated in pulse duration according to the amplitude of an error signal, wherein cyclic variation in gain of cascaded amplifier stages varies the pulse duration and high positive feedback produces bi-stable operation of a successive power stage.

Another object of the present invention is to supply a pulsed power output proportional to an input signal.

Still another object is to control the time constant of magnetic amplifier circuits.

A further object of the present invention is to provide a frequency selective system.

A still further object is to provide a frequency selective arrangement in a power regulated control system.

Other objects and features of the invention will become apparent to those skilled in the art as the disclosure is made in the following detailed description of preferred embodiments of the invention as illustrated in the accompanying sheets of drawings in which:

FIG. 1 is a block diagram of a regulated control system in accordance with a preferred embodiment of the invention;

FIG. 3 is a schematic circuit diagram of an alternate embodiment of the invention, shown in block diagram in FIG. 1, providing an alternating current output to an alternating current load when substituted for the D.C. section enclosed by dotted lines in the circuit of FIG. 2;

FIG. 4 is a schematic illustration of a room whose temperature is to be regulated in accordance with the present invention;

FIGS. 5a and 5b are transfer curves of control characteristics of first and second stage magnetic amplifiers respectively, illustrated in FIG. 2;

FIG. 6 illustrates typical waveforms of modulated D.C. power pulse outputs;

FIG. 7 is a graph illustrating current and frequency outputs; and

FIG. 8 is a block diagram of a frequency selective system in accordance with another preferred embodiment of the invention.

Figure 2:
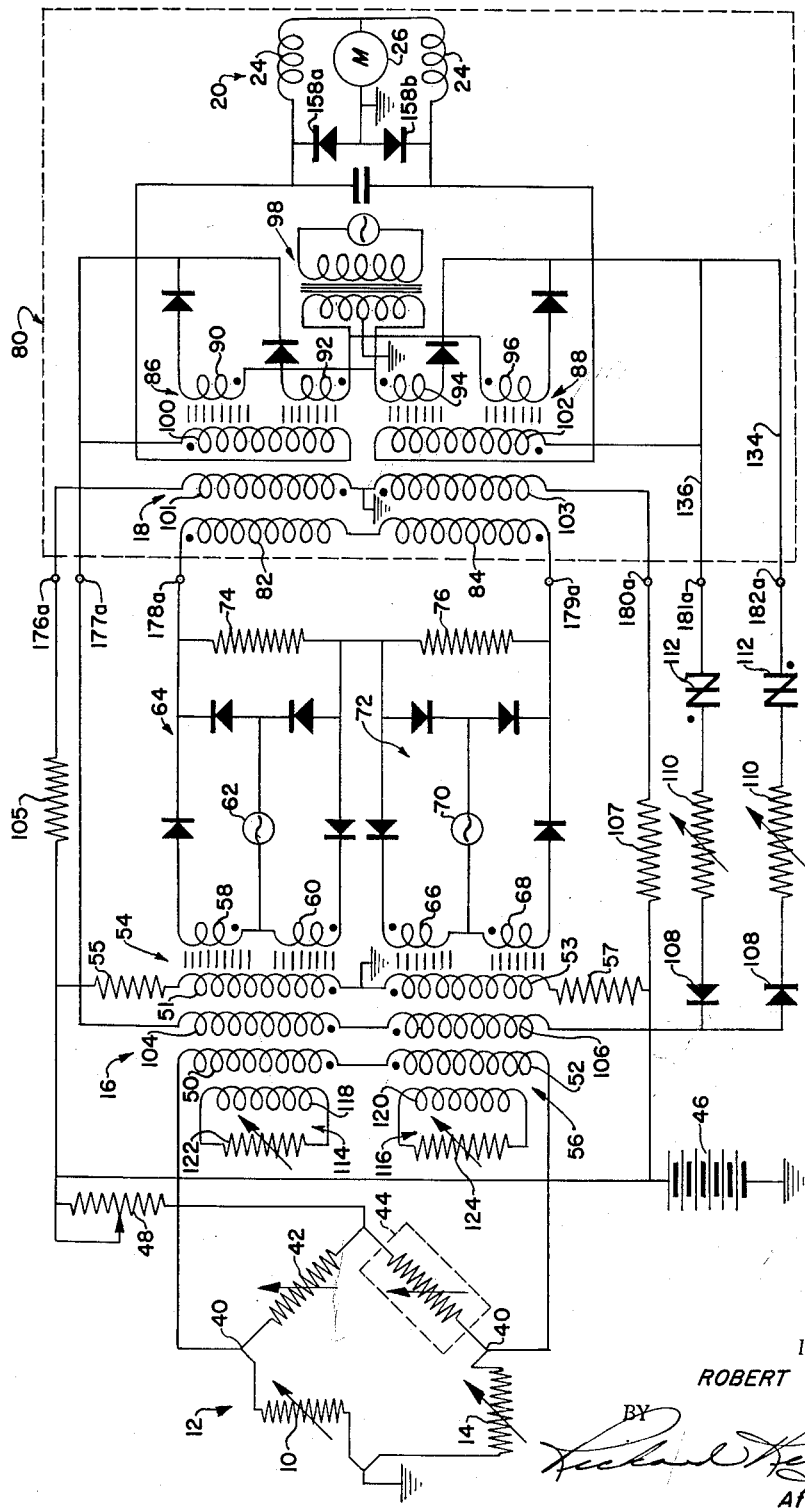
FIG. 2 is a schematic circuit diagram of a preferred embodiment of the invention shown in block diagram in FIG. 1.

Referring now to the drawings wherein like reference characters designate like or corresponding parts throughout the several views, there is shown in FIG. 1 which illustrates a preferred embodiment, a regulated control system having a pulse duration modulated output supplying regulated power to an output element. The system includes a reference selector 10 supplying a desired or preselected reference quantity which is coupled to a comparator 12 for comparison with the actual output of the system as measured by a sensor element 14. The sensor element converts the value of the condition to be regulated to quantities capable of being compared by an impedance network or the like of the comparator 12 to produce a resultant or error signal in the form of a voltage or current output which is supplied to the input of magnetic amplifiers 16. The differential magnetic amplifier circuit 16 may include low level push-pull magnetic amplifiers having a bi-directional output which is coupled to a power stage comprising bi-stable magnetic amplifiers 18 selected to drive output load elements 20. The bi-stable magnetic amplifiers 18, which comprise the power stage, are driven by a sufficient number of cascaded push-pull stages 16 to raise the level of the output of the comparison circuit to the signal level required by the control windings of the power stage to provide full power input to the load.

Referring to FIG. 2 for a detailed description of the preferred embodiment, the comparator 12 is illustrated by an impedance network or Wheatstone bridge having an error signal output whose polarity is indicative of the direction of sensor response above or below the point of preselected reference and whose amplitude is proportional to the difference in reference and sensor quantities. The signal is coupled to the first stage magnetic amplifier circuit 16 wherein the low level signal input to the amplifiers is raised to a signal level required by the following stage of power amplification by the bi-stable magnetic amplifiers 18 to produce full power pulses supplied to the load. The load or output elements 20 include a series motor having a split field and a common return to ground through the motor armature.

The schematic drawing of FIG. 4 illustrates the operation of typical output elements of a preferred embodiment in which the temperature of a room 22 is regulated by controlling output elements 20 including an actuator shown as a bi-directional motor having split field windings 24 and an armature 26 coupled to a valve element 28 which regulates the air through a duct 30 from hot and cold supply ducts 32 and 34. Outflow means 36 is provided for the exhaust of the air from the room 22. A thermostat 38, representing the sensor element 14, in the room 22 senses the temperature in the room to provide a continuous value of resistance for comparison with a preselected reference provided by the reference selector 10.

Referring again to FIG. 2 for a detailed description of the circuit providing the preferred regulated control system, the sensor element 14 comprises a thermistor having a resistance value which is a definite reproducible function of the temperature sensed. The reference selector 10 is shown as a variable rheostat or potentiometer located in a leg of the bridge adjacent the thermistor 14 whereby the resistances may be compared by the voltage drops across the respective elements. Differences in resistance produce an output voltage at output terminals 40 as a result of the unbalance in the bridge network. In the opposite legs of the bridge, an anticipator arrangement has been provided including thermistor 42 and thermally insulated thermistor 44 preferably located in the supply duct 30 whereby temperature extremes at the duct outlet may be avoided by offsetting the unbalance in the legs including the temperature sensing and selector elements.

The input terminals of the bridge comparator 12 are supplied from the bridge and bias supply source 46 coupled to the bridge through a resistor or potentiometer 48 which is manually adjustable so as to provide control of the dead band zone indicated in connection with the transfer curve shown in FIG. 5a. An increase in voltage supplied to the bridge as a result of decreasing the resistance 48 in the supply circuit narrows the dead band zone, while decreasing the supply voltage to the bridge widens the dead band zone.

The bridge comparator 12 supplies a control current proportional to the error signal to control windings 50 and 52 of the push-pull amplifier circuit 16. The circuit arrangement including the series coupled control windings 50 and 52 is such that an increase in the signal of one polarity will cause one amplifier output to increase and the other amplifier output to decrease. A reversal of polarity of the input error signal to the amplifier circuit 16 will reverse the polarity of the output of this first stage without switching circuits.

The low level push-pull magnetic amplifiers 16 of the first stage are represented by twin core self-saturable reactors 54 and 56 which are provided with bias windings 51 and 53 respectively, and which are connected in series with bias resistors 55 and 57 respectively. The bias current in the windings 51 and 53 is adjusted to provide the desired control characteristics in the respective magnetic amplifiers or in combination, preferably as illustrated by the transfer curves in FIG. 5a.

The reactor 54 includes load windings 58 and 60 which are coupled to an alternating current power supply source 62 and a full wave rectifier bridge 64. Load windings 66 and 68 are similarly connected in push-pull relationship to an alternating current source 70 and a full wave rectifier bridge 72. The individual outputs of the push-pull amplifier 16 are applied across respective load or ballast resistors 74 and 76 to produce a resultant or differential signal output voltage whose signal level is suitable for application to the input of the bi-stable power amplifier stage supplying the load. It will be realized that the number of stages of low level amplification will depend upon the required input signal level of the power stage in order to supply a power output of sufficient amplitude to drive the ultimate load. It is apparent from the foregoing that half-wave reactors could be substituted for push-pull reactors 54 and 56 without affecting the operation, except that half-wave outputs will be provided instead of full wave outputs.

Referring now to the D.C. power output section 80, enclosed by dotted lines, the bi-stable magnetic amplifiers 18 include self-saturating reactors 86 and 88 having series connected control windings 82 and 84, respectively, which are coupled to the output of the magnetic amplifiers 16 of the first stage whereby predetermined variations in the input signal of each polarity will cause the corresponding reactor to conduct or be quiescent to effect the desired system output to correct the condition being regulated. In this manner the motor 26 is caused to rotate when each reactor is conducting and in the direction determined by the polarity of the input signal since the split field windings 24 of the motor are individually coupled to the reactor outputs and have a common return through the motor armature 26 to ground. Each of the reactors or magnetic amplifiers 86, 88 supplies one of the split series fields 24, the one modulating being determined by the polarity of the input signal to the power stage. In view of their bi-stable characteristic, one of the reactors 86, 88 will be continuously quiescent at each polarity and the other will modulate between quiescent and conducting to supply its associated field windings 24, depending upon the value of the condition to be regulated as shown by the resistance of sensor thermistor 14. This modulating action will be explained in detail hereinafter.

Referring now to the bi-stable magnetic amplifiers 18 for detailed description of the circuit arrangement, twin core reactors 86 and 88 include respective load windings 90, 92 and 94, 96 connected to the center tap secondary of a supply transformer 98. Full wave rectification of the output of each winding is provided by a rectifier individual to each winding. The D.C. output is fed to feedback windings 100 and 102 which are connected in series with the respective outputs whereby all of the power output current passes through the feedback windings. The feedback windings are connected to produce a positive magnetic feedback in the corresponding saturable reactors 86 and 88.

Interstage feedback is provided to the magnetic amplifiers in the first or low level amplification stage by a feedback circuit arrangement individually coupling the output of the power stages to respective feedback windings 104 and 106. The feedback windings 104 and 106 are coupled in the reactor circuit to provide a negative magnetic feedback. The interstage feedback circuit arrangement includes individual feedback paths 134 and 136 for each output polarity. The individual paths provide for separate control of the feedback current depending on which output amplifier is delivering power to the field of the split field motor. Each feedback path includes a rectifier 108 polarized to isolate the feedback paths. Resistors 110 are shown adjustable for controlling the feedback current from the power output stage and Zener diodes 112 providing feedback for outputs above a predetermined level only, namely, the reverse current breakdown voltage of the respective diodes, e.g., approximately five (5) volts. The return path for the feedback circuit through windings 104 and 106 includes the feedback winding of the quiescent reactor of the magnetic amplifier 18, the non-energized motor field windings 24 and the motor armature to ground. Thus, when reactor 86 is conducting, its output will be fed through terminal 177a, feedback winding 104, feedback winding 106, lower rectifier 108, lower resistor 110 and Zener diode 112, terminal 182a, conductor 134, feedback winding 102 of reactor 88, which is quiescent, lower motor field winding 24 and motor armature 26 to ground. In this respect it is desired to point out that the negative feedback current through feedback windings 104 and 106 is very small compared to both the current passed by the quiescent reactor and the power current through the conducting reactor. Thus, if the power current should be one ampere the current through the quiescent reactor may be of the order of ten milliamperes while the feedback current to the first stage may be of the order of one milliampere.

Saturable reactors 86 and 88 are provided with bias windings 101 and 103 which are connected to the bias supply source 46 through respective bias resistors 105 and 107 to produce a negative magnetic bias in saturable reactor circuits 86 and 88. Bias currents in the bias windings are individually adjusted to provide desired control characteristics for the amplifiers.

In order to adjust the time constant of the control circuit and the time interval between pulses, time constant circuits 114 and 116 individual to reactors 54 and 56 respectively, are inductively coupled to the reactors by windings 118 and 120 connected across resistors 122 and 124 respectively. The time constant circuits 114 and 116 are responsive to changes in the m.m.f. of the respective reactors to produce counter m.m.f.'s introducing a time delay in the response of the reactor circuit. Adjustment of resistor values controls the time delay and the time interval between pulses.

In operation, the circuit in FIG. 2 provides a regulated control system in which a pulse duration modulated signal is generated to supply regulated power to an output by a differential low level amplification of a bi-directional input to the amplifiers as provided by the bridge comparator circuit 12. Both reactors of the first stage are adjusted for maximum gain and the resultant signal voltage output taken across the load resistors 74 and 76 produces a resultant control current in the input control windings 82 and 84 of the bi-stable amplifiers 18. The saturable reactors 86 and 88 of the power stage have individual outputs which are coupled to the load 20 through respective feedback windings. The feedback windings 100 and 102 are connected to produce a positive magnetic feedback in the respective saturable reactors 86 and 88 providing bi-stable operation as illustrated by a typical S transfer control characteristic of FIG. 5b. The bi-stable operation of the power stage amplifiers 18 provides a snap-action in the generation of full power pulses supplied to the load.

The interstage feedback to the first stage from the power stage produces a negative magnetic feedback in the magnetic amplifiers 16. An output voltage from either of the bi-stable amplifiers 18 exceeding the reverse current breakdown voltage of the Zener diodes 112 will reduce the output of the amplifiers 16 to quiescent current values except when the input from the bridge to the control windings 50 and 52 is of such a magnitude that it overrides the negative magnetic feedback produced by the feedback windings 104 and 106 to maintain the reactors conductive. To illustrate the operation, let it be assumed that the sensor element 14 is a thermistor or other temperature sensitive resistor which detects a temperature below the temperatures selected by the reference selector 10. In comparing the two resistances in the comparator bridge 12, the voltage drop across the temperature selector resistor and the thermistor is different producing an unbalance in the bridge and an error signal current input to the control windings of the amplifiers 16. The signal current through the control winding 50 tends to increase the flux to saturate the core of the saturable reactor 54 while tending to decrease the flux in the cores of the saturable reactor 56. It follows that an increase in flux saturating the core of the reactor 54 will produce an output or tend to increase the output of the reactor, while any output of reactor 56 tends to decrease. The net effect is to produce a resultant voltage output which is positive and a resultant positive current input to the control windings of the bi-stable magnetic amplifiers 18 to produce or increase the flux in the cores of reactor 86 and reduce the flux in the core of reactor 88.

The bi-stable operation of the power amplifiers 18 is illustrated by the control characteristics of the individual amplifiers shown in FIG. 5b. The reactor 86 will not conduct to produce positive power pulses until the control current input $I_c$ reaches a predetermined level when the reactor 86 will turn on full, i.e., conduct to produce pulses at maximum output levels.

The output of reactor 86 is pulsed when the feedback voltage applied to the feedback path 134 exceeds the reverse current breakdown voltage of the Zener diode and the control current input to the first stage reactor is within the range indicated by the modulation band zone, e.g., as illustrated in FIG. 5a. Assuming the time constants of the circuits remain unchanged, the length of the power pulse or period of conduction of the reactor 86 depends upon the amplitude of the input error signal.

Just as the reactor 86 would not turn on until a predetermined control current had been reached, as regulated by the negative magnetic bias, the reactor 86 will not turn off until another lower control current has been reached as regulated by the positive magnetic feedback. This bi-stable control characteristic has been illustrated in FIG. 5b.

The resulting output of reactor 86 produces a resultant field in the motor and an output torque and rotation moving the valve 28 to admit a greater proportion of hot air thereby changing the ratio of hot and cold air admission to the room 22 through the inlet duct 30 to raise the temperature therein to the temperature selected by the reference selector 10. The regulating operation of the system for higher temperatures than those selected by reference selector 10 is similar to the operation described supra. However the output is negative and reactors 56 and 88 are operative to produce the negative-sensed power output.

As pointed out previously, the system output elements or load require application of full power to operate satisfactorily. In many instances, full power pulses modulated in pulse duration satisfy operational requirements. The amplitude of the input signal from the bridge 12 controls the duration of the power pulse output to the load, i.e., pulse duration modulation. Input error signals of higher amplitudes resulting from a greater unbalance of the bridge 12, produce pulses of longer duration to supply more power to the actuator for system output elements or load 20. Input error signals of even higher amplitudes producing control currents beyond the range of the modulation band zones produce continuous power outputs, i.e., power pulses of extended length.

In FIG. 7, typical output currents of the system have been plotted against typical error signal current inputs to the first amplifier stage. Primarily, the pulse duration of the modulated power output controls the slope of curves 130 and 132, although the time constant of circuits 114 and 116 controlling the pulse intervals also affects the slope of the curves. Further, the slope of each of the curves 130 and 132 is separately and individually adjustable by controlling the feedback current through the individual interstage feedback paths 134 and 136 by adjustment of the value of the resistors 110 in the respective paths. For example, decreasing the resistance in a feedback path will increase the negative magnetic feedback. In turn, the negative magnetic feedback decreases the slope of the curve tending to decrease the power output of the respective magnetic amplifier. Similarly, increasing the resistance in feedback paths 134 and 136 decreases the magnetic feedback to increase the slope of its respective curve increasing the power output for a given error signal current input.

Typical transfer control characteristic curves are shown in FIG. 5a including transfer curves 138 and 140 for reactors 54 and 56 respectively. A typical composite transfer curve of the reactors 54 and 56 the steepest composite gain is illustrated by a curve 142. This maximum gain operation is secured at an optimum bias determined by the ampere turns of the initial bias windings 51, 53 which are fed with a fixed bias current from the source 46. The effect of interstage feedback reducing the gain of the reactors 54 and 56 and the output current to quiescent value is illustrated by transfer curves 144 and 146 shown in dotted lines where the characteristics have been changed shifting the curves as a result of negative magnetic feedback. The shift in control characteristics illustrated in FIG. 5a is produced by a feedback from the saturable reactor 86 producing magnetic subtraction in the reactor 54 and addition in the reactor 56. The result is a reduction in output of the reactor 54 and an increase in the output of the reactor 56. The resultant or differential output of the first stage magnetic amplifiers is thereby decreased as indicated by the clockwise shifting of resultant transfer curve 142 to the position indicated by dotted line 148 providing a substantial decrease in gain for this stage and lowering the signal level at the input of the power stage. If the error signal control current is within the modulation band zone, the decrease in gain will lower the signal level at the input of the power stage below the level required to sustain conduction and the individual amplifier output is reduced to quiescent value. The resulting on-off operation provides pulse duration modulation.

The maximum clockwise shifting of the composite transfer curve 142 about the reference point is indicated by dotted line 148a whose intersection with the first stage output current OFF line will, by vertical projection, give the maximum value of the error signal current at which the bi-stable output reactor can be driven quiescent by lowering of its input signal (first stage output) and hence will determine the upper control current or error signal limit of the modulation band zone. The lower limit of this zone will be determined by the vertical projection of the intersection of the composite curve 142 with the first stage output current ON line as shown in FIG. 5a. In this FIG. 5a, Ic is the error signal current supplied by the comparator 12 to the magnetic amplifier control windings 50, 52; Io is the first stage output current fed as an input signal to control windings 82, 84 of bistable magnetic amplifiers 18; ON and OFF are the values of first stage output current at which the magnetic amplifiers 18 are driven conducting and quiescent, respectively.

The pulse duration modulated output of the system for error input signals of different magnitudes is indicated by the waveforms in FIG. 6 in which pulses 150 result from a small error due to a slight temperature deviation from the preselected reference. The power pulses 150 are produced by a small error signal input to the low level control windings 50 and 52, increasing the flux density of reactor 54 and decreasing the flux density of reactor 56 sufficiently to produce a differential output causing the reactor 86 to conduct.

The output control current of reactor 86 is coupled to the load, and to the feedback winding 104 to produce a negative magnetic feedback overriding the magnetic flux produced by the error input signal and reducing the output to quiescent values. Since the error input signal is small, but within the modulation band zones, the feedback signal overrides it within a very short time period to produce very short output control current pulses 150. This operation might be exemplified in FIG. 5a in the condition where the control current remains substantially at the minimum value required to drive the output reactor conducting, that is; the value represented by the vertical projection of the intersection of composite curve 142 with the first stage output current line ON. With the control current remaining substantially at this value the composite curve 142 swings to the position represented by the dotted line 148 where this value of control current is no longer sufficient to maintain the reactor conducting and it assumes its quiescent state. The time required to swing the composite curve from its position 142 to its position 148 is the period in which system output current flows to produce the pulse 150. For increased values of control current the composite curve 142 swings further at the same rate to produce increasingly long pulses of system output current until, at values above the control current that corresponds to the intersection of line 148a with the output current OFF line, the conduction of the output reactor is continuous.

Control current pulses as shown by typical waveforms 152 provide approximately 50% of rated motor power. The control current pulses 152 are produced in a similar manner as described in connection with the pulses 150 wherein a higher amplitude error input signal requires longer period for the feedback signal to maintain the net flux in the core below saturation level as it overrides the higher amplitude magnetic flux produced by the higher amplitude error signal current in the control windings 50.

An even greater unbalance of the bridge 12 produces an input error signal of larger magnitude requiring an even longer time period to decrease by the negative magnetic feedback in the reactor 54. Resulting full power pulse 154 or continuous full power output indicates the end of the modulation band zone where the system no longer produces power pulses, but continuous full power output.

Negative pulses 156 are produced by negative error signal control currents in the control winding of the first stage to reverse the resultant field of the motor and produce approximately 50% of rated motor power. Pulses 156 result from the sensor element detecting quantities above those preselected by the reference selector, for example, a temperature higher than the temperature selected which produces an unbalance in the bridge 12, but of reversed polarity from the error input signal previously described resulting in a positive output, e.g., power pulses 150 and 152 or a continuous power pulse 154. Upon a reversal in polarity of the error signal, i.e., negative polarity, the output of saturable reactor 56 is increased and the output of saturable reactor 54 is decreased producing a negative resultant or differential signal output which is coupled to the input or control windings of the bi-stable magnetic amplifiers 18. The power output of the reactor 88 produces a resultant magnetic field in the motor favoring the portion of the field winding 24 individual to the output of reactor 88. The dominant field reverses the direction of the motor from the direction of rotation resulting from pulses 150 and 152 or continuous pulse 154. The counter E.M.F. of the armature at the instant of conclusion of a pulse is circulated through the motor by a rectifier 158b, or a rectifier 158a depending upon the polarity.

Referring again to FIG. 7 for a detailed analysis of the frequency characteristic of the power pulse output, frequency curves 160 and 162 shown on the graph are typical of frequency variations with increased error signal current due to non-linearities of the thermistor 14 in the bridge comparator. It will be noted in observing these curves, the pulse rate or frequency increases up to approximately 50% error signal current which is the error signal required to operate the motor at 50% of rated power. It should be noted that frequency curves 160 and 162 are typical if the saturable reactors are not operated in a region in which non-linearities of the reactors, if any, would tend to introduce a time delay or such non-linearities are compensated for in the circuit. Also in referring to FIG. 6, it will be noted that the change in frequency is apparent upon observing the decrease in the time period of the cycle from pulses 150 to 152. As shown by the typical pulse waveforms, the frequency of the pulses 152, in this instance, is more than double the frequency of the pulses 150. The foregoing frequency characteristic will be described more fully in the description of the alternate preferred embodiment of FIG. 8.

Referring now to FIG. 3 for a detailed description of the alternate embodiment illustrated in the schematic circuit diagram, bi-stable magnetic amplifiers of a power stage 18a include self-saturating saturable reactors 170 and 172 coupled to an alternating current actuator or load shown as a motor 174. The alternate embodiment provides a regulated alternating current power output for controlling an alternating current load when substituted for the direct current power amplifiers 18 and output elements or direct current load 20 enclosed by dotted lines 80 in FIG. 2. Input terminals 176, 177, 178, 179, 180 and 181 of the alternating current version shown in FIG. 3 are connected to respective terminals 176a, 177a, 178a, 179a, 180a and 181a and of the direct current version shown in FIG. 2. The terminal 182a remains disconnected as the circuit therethrough is surplusage in the alternating current version of the invention.

Referring to the circuit diagram of the alternating current power amplifiers and load, the resultant output signal voltage of the first stage amplifiers shown in FIG. 2 is coupled to series connected control windings 183 and 184 wherein a signal of one polarity tends to increase the flux density or saturation of the core of one reactor and decrease the flux density or saturation of the core of the other reactor. The resultant signal output is applied across the terminals 178 and 179 which are connected to terminals 178a and 179a.

Saturable reactors 170 and 172 include D.C. bias windings 186 and 187 having a common connection to ground with opposite ends connected to input terminals 176 and 180 connecting the bias windings to individual bias current paths at terminals 176a and 180a shown in FIG. 2. In this manner, the bias windings are connected to the bias supply source 46 through corresponding biasing resistors 105 and 107, individual to the bias current paths. Bias windings 186 and 187 produce a negative magnetic bias in the reactors adjusting the reactors for optimum control characteristics.

Referring now to the individual bi-stable power amplifier circuits, reactor 170 includes dual load windings 188 and 189 having individual cores and a common feedback winding 190. The load windings 188 and 189 of reactor 170 are connected to an alternating current supply source 192. The return circuit to the alternating current source 192 through load windings 188 and 189 includes rectifiers 194 for self-saturation of the cores individual to the load windings. A resistor 196 connected in series with the output of the load windings supplies a feedback rectifier bridge 198 to provide a direct current feedback signal current proportional to the output of the reactor 170. The return circuit further includes a split field winding 200 which is connected to the other side of the alternating current source 192. The feedback circuit individual to the reactor 170 includes a series resistor 202 and the feedback winding 190, the latter being connected to the opposite side of the full wave feedback rectifier bridge 198. A load feedback rectifier bridge 204 is connected in parallel with the motor 174 to provide power output voltage to the feedback path 136.

In the alternating current version of FIG. 3 the feedback current through twindings 104 and 106 will always be in the same direction since the right-hand side of bridge 204 is always positive and hence the feedback current will always flow through the feedback path 136 and terminal 181a regardless of which output reactor is conducting. This however will produce the same result in returning a conducting reactor of magnetic amplifiers 18 to quiescent state regardless of the polarity of the output of the comparator bridge 12. This will be understood from an inspection of the performance curves of FIG. 5a wherein the curve 142 represents the operation of the magnetic amplifiers 16 at optimum bias for the steepest slope of the curve and hence the steepest composite gain from the magnetic amplifiers. Since the initial bias on the reactors of the magnetic amplifiers 16 is adjusted to optimum (by adjusting the initial current from bias supply 46 through bias windings 51, 53) it follows that any change in this bias, regardless of the polarity of the change, that is, whether it is increased or decreased, will result in a lessening of the gain and hence, referring to FIG. 5a, a swinging of the curve 42 clockwise about the reference point to positions such as 148, 148a. The feedback current through path 136 returns the magnetic amplifiers 16 to cut-off or their quiescent output value unless the error signal control currents in the control windings 50 and 52 are beyond the range of the modulation band zones.

In a similar manner, the reactor 172 amplifies negative inputs to produce power pulses or outputs to drive the motor 174 in the opposite direction by producing a resultant flux in a field winding 200a in response to negative error signals. The amplified error signals are coupled to the terminals 178 and 179 of the circuit of FIG. 2. It may be noted that the reactors 54 and 56 need not be full wave in either version of the control system, but may be half-wave having a dual directional output across the load resistors 74 and 76, however, it is preferred to employ full wave circuits.

The operation of the alternate embodiment of FIG. 3 which provides alternating current outputs 180° out of phase or of opposite polarities to an alternating current load, is similar to the operation of the reactors 86 and 88 of FIG. 2. However, it will be noted that the alternating current output is converted to direct current to provide D.C. feedback signals which are coupled to the feedback windings to produce a positive magnetic feedback in the bi-stable magnetic amplifiers 18a and a negative magnetic feedback in the first stage low level differential magnetic amplifiers 16. Thus, an input signal of a predetermined amplitude extending the operation into or above the modulation band zones is coupled to the terminals of the control windings 183 and 184 to produce a field current in a corresponding field winding and a resultant flux and torque in the motor 174. The resultant torque results in rotation of the rotor to operate a valve or other output element.

A signal control current of the opposite polarity coupled to the control windings 183 and 184 produces a resultant field in the opposite direction in the motor 174 reversing the torque and direction of the motor. The turning on and off of the magnetic amplifiers in the pulsing action is produced over the modulation band zone where the input control current does not exceed the maximum current level of the modulation band zone indicated on the transfer curve of FIG. 5a. Stated otherwise, the negative magnetic feedback produced by the windings 104 and 106 is capable of reducing the output of the power stage to quiescent values only when the control currents $I_c$ are below the upper end of the modulation band zone. A conducting bi-stable reactor will produce continuous full power A.C. outputs when the error signal output from the bridge 12 exceeds the maximum control current $I_c$ which is within the modulation band zones.

Referring now to the block diagram shown in FIG. 8, a frequency selective system has been shown comprising a regulated system 210 of the type such as shown in FIGS. 1 and 2 having frequency characteristic curves in which an input, including a source of variable amplitude signals, such as the output of a comparator 12, is coupled to magnetic amplifier circuit means providing an amplified power output varying in frequency in response to varying amplitude input error signals. Band pass, high pass or low pass filters 212, 214 and 216 selectively couple the output of the regulated system 210 to a selected one or more of the output elements 218, 220 and 222. A common feedback 224 has been illustrated, however, it is apparent that individual feedbacks may be provided in the event individual regulation of the separate output elements is desirable.

In the operation of the frequency selective system illustrated in FIG. 8, the regulated system 210 includes amplifier circuit means, such as the magnetic amplifiers 16 in FIG. 2, which are responsive to changes in feedback of the input circuit and variable amplitude error signals to produce full power output pulses having a frequency which is a function of the amplitude of the input to the amplifiers 16 and 18 over the ranges indicated in FIG. 7. Assuming, for example, the filter 212 is a low pass filter, low amplitude input signals to the amplifiers resulting from a small error signal produce relatively low power and low frequency regulator outputs. The low pass filter 212 couples the low power, low frequency signals of short duration to the output elements 218 whereas filters 214 and 216 block the signal to prevent actuation of output elements 220 and 222. A higher amplitude error signal will produce a higher power and intermediate frequency regulator outputs. It will be noted that the output of regulator 210 is not a variable amplitude signal, but a pulse duration modulated signal. The intermediate frequency output of the regulator 210 is passed by the band pass filter 214 and fed to the output elements 220. A high amplitude error signal coupled to the magnetic amplifiers of the regulator 210 will produce a high power, high frequency signal output which will be passed by a high pass filter 216 to actuate output elements 222. In accordance with the preferred operation of FIG. 8, filters 212 and 214 block the high frequency signal output of the regulator 210, whereby the output of the regulator 210 is selectively coupled to the output elements 222.

The feedback of the output element coupled back to the regulator completes the circuit for a closed loop or floating system in which the output elements are regulated to the reference inputs supplied by a selector such as the selector 10 shown in FIG. 1. The filters 212, 214 and 216 may be rearranged or combined to actuate the output elements individually or in selected combinations, as for example, a filter 212 may be a low pass filter coupling low power signals to output elements 218 and filters 214 and 216 may be high pass or band pass filters to actuate output elements 220 and 222 simultaneously. As is evident from the foregoing description of the operation, the sequencing of the output elements in accordance with the power output of the regulator 210 may be controlled by the selection of the respective input filters for the output elements.

Various modifications and variations of the present invention are contemplated and are evident in the light of the above teachings without departing from the spirit and scope of the invention.

I claim:

1. A pulse generator for producing power pulses in response to an input signal comprising: static amplifier circuit means including a low level stage and a power stage coupled in cascade, said static circuit means including feedback circuit means and time constant circuit means for producing cyclic variation in gain of the low level stage and bi-stable operation of the power stage.

2. A pulse generator comprising: multistage static amplifier circuit means coupled in cascade, said static circuit means including plural of polarized feedback circuit means for producing negative feedback and for producing cyclic variation in gain of one stage to periodically reduce the output of a subsequent stage to a nominal amount and high amplitude positive feedback for bi-stable operation of a subsequent stage.

3. A modulator for providing pulse duration modulation in response to input signals varying in amplitude comprising in combination; static amplifier circuit means including individual amplifier stages coupled in cascade, said static circuit means including an initial stage for raising the signal level of said input signals and a subsequent power stage having an output circuit for producing full power pulses to a load, polarized feedback circuit means coupling the output of the power stage to the initial stage to provide a negative feedback at the input of the initial stage causing a cyclic variation in gain of said initial stage for cyclically reducing the signal level below the level of cut off of the power stage, and feedback circuit means coupled in series in the output circuit of the power stage for producing a positive feedback and bi-stable operation of said power stage.

4. A pulse duration modulator producing power pulses varying in duration as a function of a varying amplitude input signal comprising: static magnetic amplifier circuit means including a low level amplifier stage and a power stage coupled in cascade, interstage feedback circuit means coupled to the output of said power stage and to said low level stage and time constant means coupled to said low level stage for cyclically producing a negative magnetic feedback reducing the gain and the output signal level of the low level stage whereby the output of the power stage is reduced to quiescent value, and intrastage feedback circuit means in the power stage for providing a positive magnetic feedback to produce bi-stage operation of the power stage.

5. A pulse duration modulation generator responsive to input signals varying in amplitude and polarity to produce pulses varying in duration and of corresponding polarity comprising: static amplifier circuit means including individual low level first stage amplifiers for each polarity input signal coupled in push-pull arrangement having a common differential output and a power amplifier for each output polarity of the differential output, said static circuit means including non-linear interstage feedback circuit means coupling the outputs of said power amplifiers through individual feedback paths and polarized to provide isolated feedback paths for each polarity of output for individual feedback control, said static circuit means being responsive to said feedback to produce periodic variation in gain of said first stages, and intrastage feedback circuit means providing a feedback path individual to each power amplifier for producing positive feedback and bi-stable operation of said power amplifiers.

6. A pulse generator comprising: static amplifier circuit means including individual stages coupled in cascade, said static circuit means including feedback circuit means coupled to the output and a plurality of said stages, said feedback circuit means including a feedback circuit path having a Zener diode connected in series in which feedback currents pass through the diode in the reverse current direction, said feedback producing cyclic variation in gain of one stage, and additional feedback paths for producing bi-stable operation of a subsequent stage.

7. A pulse generator for producing power pulses modulated in duration in response to a varying amplitude input signal comprising: static magnetic amplifier circuit means including individual stages coupled in cascade, said static circuit means including feedback circuit means for producing pulses by cyclic variation in gain of one stage and bi-stable operation of a subsequent stage, and time delay circuit means inductively coupled to said one stage for controlling the time constant of the circuit and interval between pulses.

8. A static amplifier circuit for providing pulse duration modulated power pulses in response to an error input signal varying in amplitude comprising in combination; static amplifier circuit means having individual input and power stages coupled in cascade, said input stage including amplifiers connected in push-pull arrangement, said power stage including individual amplifiers for each polarity output signal of the input stage providing separate power outputs for each polarity, and feedback circuit means coupled to said stages including polarized interstage feedback paths for each polarity power output signal coupling the power output to the input stage to provide a negative feedback and dissipative time constant means also coupled to the input stage for producing cyclic variation in gain of respective amplifiers of the input stage, and intrastage feedback means providing high amplitude positive feedback to a power stage to produce bi-stable operation of said power stage.

9. Bi-stable static magnetic amplifier circuits for providing pulse duration modulated power pulses comprising in combination; magnetic amplifier circuit means having individual input and power stages coupled in cascade, feedback circuit means coupling the output of a power stage to the input and power stages to provide a polarized negative and high positive magnetic feedbacks respectively for producing cyclic variation in gain of an input stage and bi-stable operation of the power stage whereby the power output is pulse duration modulated over the range of control of the negative magnetic feedback.

10. A static amplifier circuit for providing pulse duration modulated power pulses in response to an error input signal varying in amplitude comprising in combination; static amplifier circuit means having individual input and power stages coupled in cascade, said input stage including amplifiers connected in push-pull arrangement, said power stage including individual amplifiers for each polarity output signal of the input stage providing separate power outputs for each polarity, and feedback circuit means coupled to said stages including individual interstage feedback paths for each polarity power output signal coupling the power output to the input stage to provide a negative feedback for producing cyclic variation in gain of respective amplifiers of the input stage, non-linear means individual to each interstage feedback path passing feedback signals above a predetermined level, and intrastage feedback means providing high amplitude positive feedback to a power stage to produce bi-stable operation of the power stage.

11. A bi-stable static amplifier circuit for providing power pulses comprising in combination; static amplifier circuit means having individual input and A.C. power stages coupled in cascade, feedback circuit means including interstage circuit means providing a D.C. feedback signal proportional to the power output and coupling said D.C. feedback signal to the input stage through a non-linear impedance whereby a predetermined power output voltage level is required to produce a negative feedback at said input stage and cyclic variation in gain of the input stage, and intrastage circuit means for producing a D.C. fedback signal proportional to the power output and coupling the said latter D.C. feedback signal to the power stage to provide high amplitude positive feedback for producing bi-stable operation of the power stage.

12. A regulated system comprising in combination: an input element, an output element, a sensing element, and a comparator, means for coupling said comparator to said input and sensing elements to produce an error signal, multistage static amplifier circuit means for producing pulse duration modulated power pulses proportional to said error signal including static circuit means having cascaded input and power stages coupled to said comparator, and plural polarized feedback circuit means coupled to said stages for producing negative feedback for cyclic variation in gain of the input stage and high positive feedback circuit means for bi-stable operation of the power stage.

13. A regulated system comprising in combination: an input element, an output element, a sensing element, and a comparator, means for coupling said comparator to said input and sensing elements to produce an error signal, multistage static magnetic amplifier circuit means for producing pulse duration modulated power pulses proportional to said error signal including static magnetic circuit means having cascaded input and power amplifier stages coupled to said comparator, and polarized feedback circuit means coupling the power output to said stages to produce negative fedback for cyclic variation in gain of the input stage and high positive feedback means for bi-stable operation of the power stage, said magnetic amplifier being responsive to variation in gain of the input stage and bi-stable operation of the power stage over the range of feedback control to pulse duration modulate the output of said power stage.

14. In a regulated system including an input element, an output element, a sensing element, a comparator and circuit means for coupling said comparator to said input and sensing elements to produce an error signal, multistage static magnetic amplifier circuit means for producing pulse duration modulated power pulses proportional to the amplitude of said error signal including static magnetic circuit means having a push-pull input stage and a power stage having individual amplifier circuits for each polarity output of the input stage coupled in cascade and to the error signal output of said comparator, and feedback circuit means coupled to said stages for producing negative feedback in combination with time constant circuit means coupled to said input stage for producing cyclic variation in gain of the input stage and sufficient positive feedback for bi-stable operation of the power stage to regulate the output of the power stage to be proportional to the error signal.

15. A regulated system comprising in combination: an input element, an output element, a sensing element, and a comparator, means for coupling said comparator to said input and sensing elements to produce an error signal, multistage static magnetic amplifier circuit means for producing pulse duration modulated power pulses proportional to said error signal including static circuit means having cascaded input and power stages coupled to the output of said comparator, feedback circuit means coupling the output of the power stage to the input of said stages for producing negative feedback for cyclic variation in gain of the input stage and positive feedback for bi-stable operation of the power stage, and time delay means magnetically coupled to said input stage for controlling the time constant of said cyclic variation of the system.

16. A frequency selective system comprising in combination; magnetic amplifier circuit means responsive to the amplitude of an input signal to produce power pulses varying in frequency with the amplitude of the input signal, frequency selective means connected to said magnetic amplifier circuit means for selectively separating the power pulses according to frequency, and a plurality of system output means connected to said frequency selective means for separate energization by the separated said power pulses.

17. A frequency selective system comprising in combination; a regulated system having an input including a source of variable amplitude error signals, magnetic amplifier circuit means coupled to said input and responsive to said error signals to produce power pulses varying in frequency with the amplitude of the error signals, frequency selective means having inputs coupled to said amplifier circuit means, and having individual outputs corresponding to predetermined frequency ranges, a plurality of regulated system output means, and circuit means for selectively coupling individual output means to individual outputs of said frequency selective means for selective actuation of the system outputs.

18. A frequency selective system comprising in combination; an input including a source of variable amplitude signals, magnetic amplifier circuit means coupled to said input, frequency selective means having individual outputs and including circuit means coupling said frequency selective means to the output of said amplifier circuit means, a plurality of system output means, and circuit means for selectively coupling said system output means to individual outputs of said frequency selective means, said amplifier circuit means being responsive to said variable amplitude signals to produce a pulsed output having a frequency which varies proportionally with the amplitude of said signals.

19. A regulated motor control system comprising: a first pair of magnetic amplifiers and a second pair of magnetic amplifiers; means for coupling an electrical signal representing the desired operation of the motor being controlled to the control windings of said first pair of magnetic amplifiers; the output windings of said first pair of magnetic amplifiers being coupled to the control windings of said second pair of magnetic amplifiers; the output windings of said second magnetic amplifier being coupled to control the power supplied to the motor; said control windings of said second pair of magnetic amplifiers in addition supplying a negative feedback signal through threshold means to a pair of bias windings on said first pair of magnetic amplifiers and supplying a positive feedback signal to said second pair of magnetic amplifiers, and having an additional set of closed circuited windings on said first pair of magnetic amplifiers.

20. A regulated control circuit arrangement for supplying a pulsed output signal proportional to an input signal comprising: a pair of magnetic amplifiers having their control and bias windings individually connected in series; said control windings being responsive to the input signal; said bias windings being connected to a source of unidirectional current; a pair of bi-stable magnetic amplifiers having their control and bias windings individually connected in series; the control windings of said bi-stable magnetic amplifiers being responsive to the signal induced in the output windings of said pair of magnetic amplifiers; the bias windings of said bi-stable magnetic amplifiers being connected to a source of unidirectional current; the output windings of said bi-stable magnetic amplifiers controlling the supply of current to a load; the output windings of said bi-stable magnetic amplifiers in addition supplying a positive voltage feedback signal to a pair of feedback windings on both said bi-stable and said pair of magnetic amplifiers, said feedback signal being connected to the feedback windings on said pair of magnetic amplifiers through a rectifying element and a resistance element, and a closed circuit winding on each one of said pair of magnetic amplifiers, each of said closed circuit windings being closed through a separate resistance element.

21. A regulated control circuit arrangement for supplying a pulsed current to the windings of a split field electric motor comprising: a first pair of magnetic amplifiers, said first pair of magnetic amplifiers being coupled to be responsive to the input signal, a pair of bi-stable A.C. magnetic amplifiers, said bi-stable magnetic amplifiers being coupled to be responsive to the output of said pair of magnetic amplifiers; the output of said pair of bi-stable magnetic amplifiers being coupled to control the current supplied to the split field of an A.C. motor; circuit means for coupling a D.C. feedback signal proportional to the output of said pair of bi-stable magnetic amplifiers to a feedback winding on said pair of magnetic amplifiers, and wholly conductive means coupled to control the time constant of operation of said feedback signal.

22. A regulated control circuit arrangement for supplying a pulsed current to the windings of a split field electric motor comprising: a first pair of magnetic amplifiers, said first pair of magnetic amplifiers being coupled to be responsive to the input signal; a pair of bi-stable magnetic amplifiers, said bi-stable magnetic amplifiers being coupled to be responsive to the output of said pair of magnetic amplifiers; the output of said pair of bi-stable magnetic amplifiers being coupled to control the power supplied to the split field of the motor, the output of said pair of bi-stable magnetic amplifiers in addition being coupled to provide a feedback signal to a feedback winding on said pair of magnetic amplifiers, a rectifying element disposed in the coupling between said pair of bi-stable and said pair of magnetic amplifiers for said feedback signal, and continuously conductive means coupled to control the time constant of operation of said feedback signal.

23. A regulating control circuit arrangement for supplying a pulsed current to the windings of a split field electric motor comprising: a first pair of magnetic amplifiers, said first pair of magnetic amplifiers being coupled to be responsive to the input signal; a pair of bi-stable magnetic amplifiers, said bi-stable magnetic amplifiers being coupled to be responsive to the output of said pair of magnetic amplifiers; the output of said pair of bi-stable magnetic amplifiers being coupled to control the power supplied to the split field of the motor, the output of said pair of bi-stable magnetic amplifiers in addition being coupled to provide a feedback signal to a feedback winding on said pair of magnetic amplifiers; a rectifying element disposed in the coupling between said pair of bi-stable and said pair of magnetic amplifiers for said feedback signal; and means including an individual constantly conductive closed circuit bias winding on each magnetic amplifier of said pair of magnetic amplifiers for controlling the time constant of operation of said feedback signal.

24. A regulated control circuit arrangement for supplying a pulsed current to the windings of a split field electric motor comprising: a first pair of magnetic amplifiers, said first pair of magnetic amplifiers being coupled to be responsive to the input signal; a pair of bi-stable magnetic amplifiers, said bi-stable magnetic amplifiers being coupled to be responsive to the output of said pair of magnetic amplifiers; the output of said pair of bi-stable magnetic amplifiers being coupled to control the power supplied to the split field of the motor; the output of said pair of bi-stable magnetic amplifiers in addition being coupled to provide a feedback signal to a feedback winding on said pair of magnetic amplifiers; a rectifying element disposed in the coupling between said pair of bi-stable and said pair of magnetic amplifiers for said feedback signal; and means including an individual bias winding on each magnetic amplifier of said pair of magnetic amplifiers for controlling the time constant of operation of said feedback signal, each of said individual bias windings being closed through a resistor.

25. A pulse generator for producing power pulses in response to an input signal comprising: magnetic amplifier circuit means; feedback circuit means coupled with said amplifier circuit means; and time constant circuit means coupled with said amplifier circuit means and said feedback circuit means so that a cyclic variation in gain and a variation in pulse recurring frequency are produced within said amplifier circuit means in accordance with variations in the amplitude of an input signal.

References Cited in the file of this patent

UNITED STATES PATENTS

| | | |
|---|---|---|
| 2,725,519 | Malick et al. | Nov. 29, 1955 |
| 2,730,574 | Belsey | Jan. 10, 1956 |
| 2,780,771 | Lee | Feb. 5, 1957 |
| 2,807,776 | Buechler et al. | Sept. 24, 1957 |